INVENTORS A. G. CHYNOWETH
D. E. McCUMBER
BY David P. Kelley
ATTORNEY

United States Patent Office 3,349,344

Patented Oct. 24, 1967

3,349,344

SINGLE VALLEY BULK EFFECT TRAVELING WAVE HIGH FREQUENCY OSCILLATOR, AMPLIFIER AND MODULATOR

Alan G. Chynoweth and Dean E. McCumber, Summit, N.J., assignors to Bell Telephone Laboratories, Incorporated, Murray Hill, Berkeley Heights, N.J., a corporation of New York Filed Dec. 29, 1966, Ser. No. 628,181
7 Claims. (Cl. 332—31)

This application is a continuation-in-part of United States patent application Ser. No. 401,049 of A. G. Chynoweth and D. E. McCumber filed Oct. 2, 1964.

This invention relates to the generation and amplification of coherent electromagnetic waves at high frequencies including optical frequencies, and, more particularly, to such generation and amplification in devices utilizing plasma oscillations in solids.

Since the advent of the first optical maser, or laser, which produced a coherent optical frequency output, a great deal of attention has been focused upon producing electromagnetic waves at frequencies which bridge the gap between the microwave region and the optical spectrum. This research has resulted in a large number of devices, such as gaseous masers and lasers, various types of optically pumped solid state devices, and several types of semiconductor junction devices, all of which, to greater or lesser degree, achieve the desired end of coherent electromagnetic radiation at frequencies extending from the microwave region into the optical frequency spectrum.

While these devices have produced the desired result, each, to some extent at least, has certain problems inherent to its nature. In the case of the gaseous devices it is necessary to have a suitable cavity resonator which, at optical frequencies, is formed by optically flat or confocal mirrors, which gives rise to alignment problems in addition to the inherent problems connected with containment of gases in the desired ratios and pressures. In, for example, the ruby laser, an optical cavity resonator is also required, as well as a suitably intense or powerful source of pumping radiation. In the case of junction type devices, the usual difficulties attendant in the production of a junction of the desired dimensions and characteristics are present and, as for the other types of devices, a suitable cavity resonator is generally necessary for optimum performance. In all of the aforementioned types of devices, amplification presents additional problems, such as, for example, the desirability of continuous operation, which is especially difficult to achieve in the case of the optically pumped devices.

Of fairly recent development is an oscillator which utilizes bulk effects of solid crystals to produce coherent oscillations. More particularly, the device utilizes a phenomenon known as the "Gunn Effect" which is described and analyzed in detail in an article entitled, "Theory of Negative-Conductance Amplification and of Gunn Instabilities in 'Two-Valley' Semiconductors," by D. E. McCumber and A. G. Chynoweth, IEEE Transactions on Electron Devices, vol. ED–13, No. 1, January 1966, pages 4 through 21.

The "Gunn Effect" depends upon the existence of two energy "valleys" in the material, either or both of which may be occupied by the carriers, and in which the carriers have quite disparate mobilities. Upon application of a D.C. voltage of sufficient magnitude, charge accumulation and depletion occurs over a particular domain because of a negative-resistance effect caused by electrons, i.e., carriers, being driven into the valley of lower mobility. This domain moves across the sample in the direction of the applied voltage and its transit time is the reciprocal of the oscillatory output frequency. It can readily be seen that such a device is frequency limited by the transit time dependence of the oscillatory frequency. For a sample with a particular carrier concentration power output at the fundamental transit frequency is optimized for that length of sample for which the moving domain fills approximately one-half the sample.

The present invention to a large extent overcomes many of the aforementioned difficulties. It is a solid state device, thereby eliminating the problems inherent with gases. It does not require optical pumping, or even microwave pumping. It includes a single crystal of semiconductor material, and, as a consequence, has none of the problems inherent in junction devices. Because the resonance frequency is characteristic of the material, it is not necessary to use an optical resonator in the present invention, nor is it necessary to maintain precise dimensions. In addition, since the present invention relies upon a frequency characteristic of the material, its dimensions are not a frequency or power limiting factor, as in the case of the Gunn oscillator.

Our invention is based upon the discovery that, in contrast to the more common two component plasma, in a single-component drifting solid-state plasma, such as obtains in gallium arsenide (GaAs) and indium phosphide (InP) and other types of materials ionized-impurity scattering of the drifting electron or hole plasma can be made to produce an amplification of the plasma oscillations at the plasma frequency. When an electric field is applied across a crystal of a material such as mentioned above, a plasma drift is set up. The free carriers making up the plasma are scattered by the static ionized impurity atoms, and, under normal circumstances, these scatterings cause a loss of energy by the carriers. Any collective plasma oscillations in which the carriers are participating are thereby damped and no useful result is obtained. We have found, however, that this damping of the plasma oscillations decreases with increasing drift velocity of the carriers, and beyond a certain critical drift velocity $v_p$, where a drifting carrier has sufficient energy to excite one plasmon, the quantum unit of electrostatic oscillations, the damping of the oscillations actually becomes negative and the plasma oscillations are amplified. This amplification only occurs for those oscillations whose electric field component is parallel to the plasma drift. This amplification action is to be distinguished from that in the "two-valley" types of devices, such as the Gunn oscillator, which rely upon traveling domains to produce oscillation and amplification. In the present invention, the frequency of operation is determined by the plasma frequency of the materials, not the dimensions of the device.

By suitable impurity doping of the crystal, the plasma oscillation frequency can be chosen to be from the very high microwave range into the optical frequency range. Because the impurity scattering for velocities beyond the critical drift velocity $v_p$ produces amplification of the plasma oscillations, a useful, coherent, electromagnetic wave output results. The impurity scattering effect can dominate both acoustical and optical phonon scattering and relaxation effects which have previously been observed. In addition, certain modifications to the crystal, such as by increasing the impurity concentration, can be made to ensure this dominant character. In certain materials suitable for use in the present invention, the two-valley phenomenon also occurs. These materials can be made effectively "one-valley" materials, as will be discussed hereinafter, so that ionized impurity scattering is the dominant mode.

As thus far described, the invention can be made to generate oscillations at the plasma frequency. The growth of these oscillations implies a more general negative-resistance aspect for the electrical properties of the crystal which can be used to produce amplification and modulation of external signals over a wide bandwidth. For example, if an electromagnetic wave is passed through the crystal so that its electric vector is parallel to the direction of electron plasma drift, when the wave has a frequency comparable to or less than the plasma frequency $\omega_p$, it will be amplified. This wave can also be modulated by a number of processes, such as by varying the free electron concentration by means of injecting contacts, incident light or temperature variations, or by varying the electron drift velocity by means of applied field.

In an illustrative embodiment of the invention, a slab of semiconductor material such as GaAs or InP is inserted in a waveguide capable of propagating the electromagnetic waves to be generated or amplified. A source of D-C voltage is connected across the ends of the slab to produce a carrier flow transverse to the direction of wave propagation in the waveguide, and parallel to the electric field thereof. In order that the ensuing plasma oscillations may be made controllable and also that other types of oscillations, e.g., relaxation oscillations, may be suppressed, the sides of the slab adjacent to the waveguide walls are loaded by means of a thin layer of conducting material separated from the slab by a thin layer of insulating material.

When the arrangement is used as an amplifier, electromagnetic waves to be amplified are propagated through the waveguide with their electric vector parallel to the electric field and hence to the carrier flow across the slab of material. To reduce reflections, the faces of the slab are coated with a suitable anti-reflection coating.

When the arrangement is used as a generator of electromagnetic waves, one end of the waveguide is terminated at a distance equal to an odd multiple of quarter-wavelengths at the desired frequency from the face of the slab.

In one embodiment of the invention modulation of an incident signal is achieved by means of a modulating voltage source connected across the slab and superimposed on the D-C voltage to produce variations in the carrier drift velocity, which in turn produces variations in amplitude of the applied signal.

It is a feature of the present invention that ionized impurity scattering of the carriers is the dominant effect, masking both acoustical and optical phonon scattering and relaxation effects.

It is another feature of the present invention that relaxation oscillations are suppressed and the plasma oscillations made more readily controllable by means of capacitive loading of the semiconductor slab.

These and other features of the present invention will be readily apparent from the following description, taken in conjunction with the accompanying drawings, in which.

Figure 1:
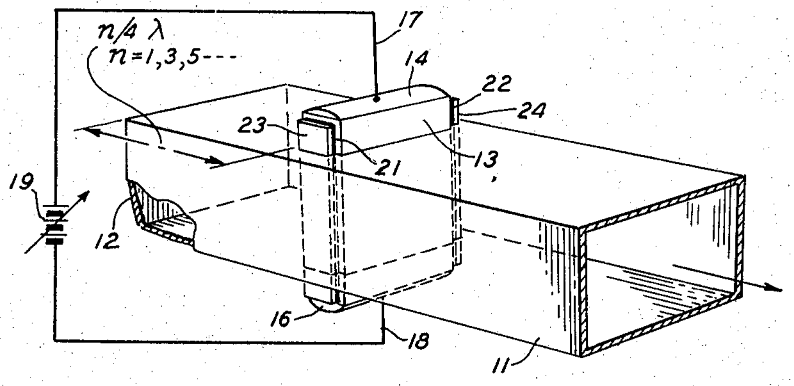
FIG. 1 is a perspective view of an oscillator embodying the principles of the invention.

In FIG. 1 there is depicted an embodiment of the invention wherein electromagnetic waves are generated. The arrangement of FIG. 1 comprises a waveguide member 11 capable of propagating waves at the desired frequency, which is terminated at one end 12. Mounted in waveguide 11 an odd multiple of quarter wavelengths from end 12 and supported by any suitable means, not shown, is a slab 13 of semiconductor material such as GaAs or InP with its narrow dimension parallel to the longitudinal axis of waveguide 11. The ends of slab 13 are plated with conducting material to form contacts 14 and 16 to which are affixed leads 17 and 18 from an adjustable source 19 of D-C voltage.

The narrow sides of member 13 are each coated with a thin layer of insulating material 21, 22 on the outer surfaces of which are thin conducting layers 23, 24.

In a single component plasma such as obtains in GaAs or InP, when the plasma is not drifting, any plasma oscillations that occur damp out. Upon the application of a voltage across the material, a carrier drift is set up, and the damping effect, which is due to the ionized impurity scattering, decreases as the drift velocity is increased. For each carrier, shortly beyond a critical drift velocity (for which a drifting carrier has enough energy to excite one plasmon), the damping associated with the carrier actually becomes negative, that is, the plasma oscillations are amplified. This change from damping to gain occurs whenever the velocity of a carrier exceeds a critical value, $v_p$, where $v_p$ is given approximately by the relation equating the carrier kinetic energy to the plasmon energy, that is, $$\frac{1}{2}m^* v_p^2 \simeq \hbar\omega_p + kT_e \tag{1}$$

where $m^*$ is the effective mass of the carrier, and $\hbar$ is the rationalized Planck's constant, $k$ is Boltzmann's constant and $T_e$ is electron temperature. The plasma oscillations will have a net gain when the gain caused by a sufficient number of high velocity carriers exceeds the losses caused by low velocity carriers.

Beyond the critical velocity, uncontrolled relaxation oscillations can occur. In order to suppress these oscillations, and to make the plasma oscillations more controllable, capacitively coupled loading of the crystal is supplied by conducting layers 23 and 24. This loading suppresses uncontrolled oscillations such as relaxation oscillations, and makes the critical or threshold velocity peak less sharp, thereby making control of the plasma oscillations easier.

In the arrangement of FIG. 1 and using GaAs as an example for the crystal 13, for an effective electron mass $m^*=0.08m_e$, where $m_e$ is the free electron mass, $\epsilon_0=12.5$ where $\epsilon_0$ is the static dielectric constant of the crystal, and $n_I \geqq n = 10^{16}$ cm.$^{-3}$ where $n_I$ is the impurity concentration and $n$ is the free electron concentration, the plasma frequency is $$\nu_p = \frac{\omega_p}{2\pi} = 1.1 \times 10^{12} \text{ c.p.s.}$$

and the threshold velocity $v_p = 1.3 \times 10^7$ cm./sec. The plasma frequency can be varied over a wide range by varying the impurity concentratiton in the crystal.

The oscillation phenomenon just described can occur in either "one-valley" or "two-valley" materials. Where one-valley materials such as, for example, indium antimonide (InSb) doped with tellurium or lead telluride (PbTe) doped with, for example, an excess of tellurium, are used, Gunn type oscillations are not encountered. In two-valley materials, such as gallium arsenide, Gunn oscillations will tend to occur upon application of a certain threshold voltage, unless the material is made effectively a one-valley type material. In some instances the operating voltage range of the device of the present invention will never reach the critical Gunn voltage. On the other hand, to ensure that Gunn oscillations are not generated, the operating temperature of the device may be lowered or the following relationship observed, $$nL < 2.0 \times 10^{11} \text{ cm.}^{-2} \tag{2}$$

where $n$ is carrier density and L is the length of the sample.

Lowering the temperature has the effect of reducing the critical carrier velocity $v_p$ and hence the applied field at which ionized impurity scattering amplification occurs, while the Gunn threshold remains substantially the same. Observance of Equation 2 has the effect of preventing the Gunn effect from occurring regardless of operating voltage, as pointed out in the aforementioned McCumber and Chynoweth article.

From the foregoing it can be seen that even two-valley materials are, in the mode of the present invention, essentially one-valley materials to the extent that the Gunn oscillations are suppressed. Thus it may be said that the material used in accordance with the principles of the present invention, whether in fact it is a one- or two-valley material, has a one-valley characteristic.

In the design of an oscillator using the principles of the present invention, when the frequency of operation $\omega_p$ is selected, both the carrier concentration $n$ and the carrier velocity $v_p$ are determined from Equation 1 and from the relationship $$1/2m^*v^2_p \geq \hbar\left(\frac{4\pi ne^2}{m^*}\right)^{1/2} \quad (3)$$

where $e$ is electron charge. It is desirable that the carrier velocity exceed the thermal velocity. This can be achieved by applying a sufficiently large field E, or by lowering the temperature T. This latter operation also aids in suppression of two-valley action as discussed before.

Figure 2:
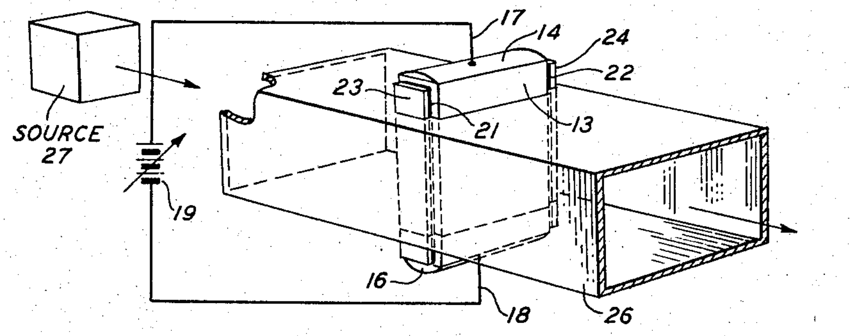
FIG. 2 is a perspective view of an amplifier embodying the principles of the invention.

In FIG. 2 there is depicted an amplifier utilizing the principles of the present invention. Inasmuch as the amplifier configuration is substantially the same as the oscillator configuration of FIG. 1, the same reference numerals have been used where the designated elements are the same. In the arrangement of FIG. 2, the crystal or slab 13 of GaAs or other suitable material is mounted in a waveguide 26 which is open at both ends. Electromagnetic wave energy to be amplified is directed from a source 27 into waveguide 26 for propagation therethrough, with its electric vector parallel to the direction of carrier drift in crystal 13. The electric field of the wave couples to the drifting and scattered carriers within the crystal with the result that the wave is amplified by carriers which exceed the critical velocity $v_p$. In order that reflections may be reduced or substantially eliminated, it is desirable to coat the faces of the crystal 13 with a suitable antireflection coating, not shown. This coating can advantageously be used in all of the embodiments of the present invention.

Figure 3:
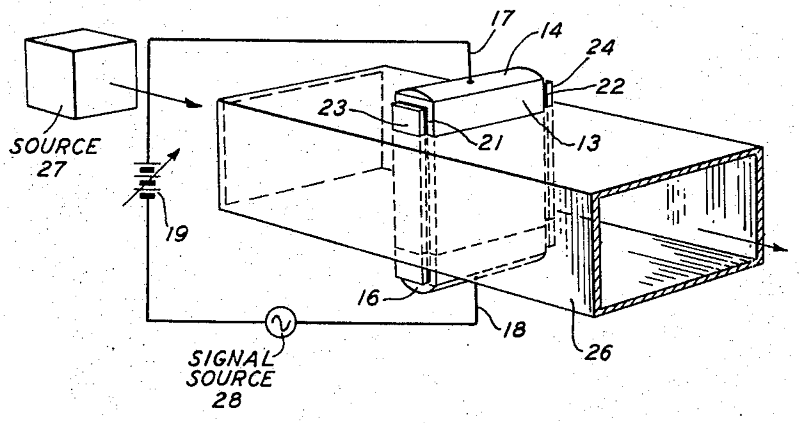
FIG. 3 is a perspective view of a modulator embodying the principles of the invention.

In the foregoing it has been pointed out that for carriers with drift velocities less than the critical velocity, plasma oscillations are damped and for those with velocities greater than the critical velocity, they are amplified. This phenomenon makes possible the modulation of a signal wave incident on the crystal as well as the modulation of the output of the device when, as in FIG. 1, it is used purely as a generator. In FIG. 3 such a modulation scheme is shown, which is substantially identical to the arrangement of FIG. 2 except for the source of modulating voltage 28 in circuit with battery 19. In operation, the voltage of source 19 is adjusted to produce a plasma drift velocity in crystal 13 that is closed to the critical velocity $v_p$. The modulating signals from source 28 are superimposed on this voltage, with the result that the incident wave from source 27 is attenuated or amplified in accordance with the voltage variations of the modulating signal.

While only one type of modulation has been shown, other types are possible such as varying the free electron concentration by means of injecting contacts, incident light, or temperature variations.

The foregoing description of the principles of the invention utilized GaAs and InP as examples of suitable crystal materials. Numerous other materials may, however, be used. It is preferable that the material have a low deformation potential, which means that GaAs is not necessarily the optimum material.

The foregoing specific embodiments of the invention are for purposes of illustrating the principle thereof only. Numerous other arrangements utilizing these principles may occur to workers in the art without departing from the spirit and scope of the invention.

What is claimed is:

1. A high frequency device comprising a single crystal member having free carriers of a single kind and ionized impurities therein and having a one-valley characteristic, said member exhibiting a drifting single component plasma under the influence of an electric field, said plasma being characterized by a plasma oscillation frequency and a critical drift velocity at which a carrier excites one plasmon, and means for producing an amplifying plasma oscillations comprising means for producing carrier impurity scattering at a plasma drift velocity in excess of the critical drift velocity.

2. A high frequency device as claimed in claim 1 and further including means for suppressing relaxation oscillations within said crystal member.

3. A high frequency device comprising an electromagnetic waveguide, a single crystal member mounted in said waveguide, said crystal member having free carriers of a single kind and ionized impurities therein and having a one-valley characteristic, said member exhibiting a drifting single component plasma under the influence of an electric field, said plasma being characterized by a plasma oscillation frequency and a critical drift velocity at which a carrier excites one plasmon, means for amplifying the plasma oscillations comprising means for producing carrier impurity scattering at a plasma drift velocity in excess of the critical velocity, and means for suppressing relaxation oscillations within said crystal member, said last-mentioned means comprising conducting members adjacent to and insulated from the sides of said crystal member.

4. A high frequency device as claimed in claim 3 wherein said waveguide is terminated at one end and said crystal member is mounted an odd number of quarter-wavelengths of plasma frequency from said terminated end.

5. A high frequency device as claimed in claim 3 wherein said waveguide is open at both ends and including means for directing electromagnetic waves to be amplified into said waveguide for propagation therethrough with the electric field of said waves parallel to the direction of plasma drift within said crystal.

6. A high frequency device as claimed in claim 3 and further including means for varying the output of said device in accordance with a modulating signal.

7. A high frequency device as claimed in claim 6 wherein the means of varying the output comprises a source of modulating signals connected across said crystal member.

References Cited

IBM Journal R. & D., vol. 8, 1964, "Instabilities of Current in III–V Semiconductors," p. 141.

IEEE Transactions on Electron Devices, vol. ED–13, No. 1, January 1966, "Theory of Negative-Conductance Amplification and of Gunn Instabilities in 'Two-Valley' Semiconductors," pp. 4–21.

ROY LAKE, *Primary Examiner.*

D. R. HOSTETTER, *Assistant Examiner.*